(12) United States Patent
Hall et al.

(10) Patent No.: US 6,234,687 B1
(45) Date of Patent: May 22, 2001

(54) SELF-ALIGNING METHOD AND INTERLOCKING ASSEMBLY FOR ATTACHING AN OPTOELECTRONIC DEVICE TO A COUPLER

(75) Inventors: Richard R. Hall, Endwell; How Tzu Lin, Vestal, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/384,094

(22) Filed: Aug. 27, 1999

(51) Int. Cl.[7] .................................................. G02B 6/36
(52) U.S. Cl. ................................................ 385/88; 385/89
(58) Field of Search ................................ 385/88–94, 14, 385/33, 49, 50, 52, 82

(56) References Cited

U.S. PATENT DOCUMENTS

| | | | |
|---|---|---|---|
| 4,466,696 | 8/1984 | Carney | 385/88 X |
| 5,163,108 | 11/1992 | Armiento et al. | 385/89 |
| 5,212,754 | 5/1993 | Basavanhally et al. | 385/90 |
| 5,266,352 | 11/1993 | Filas et al. | 427/163 |
| 5,574,814 | 11/1996 | Noddings et al. | 385/90 |
| 5,611,011 | 3/1997 | Morlion et al. | 385/59 |
| 5,631,988 | * 5/1997 | Swirhun et al. | 385/89 |
| 5,781,682 | 7/1998 | Cohen et al. | 385/89 |
| 5,790,733 | 8/1998 | Smith et al. | 385/88 |
| 5,796,714 | 8/1998 | Chino et al. | 372/50 |
| 5,854,867 | 12/1998 | Lee et al. | 385/49 |

* cited by examiner

Primary Examiner—Phan T. H. Palmer
(74) Attorney, Agent, or Firm—Salzman & Levy; Lawrence R. Fraley

(57) ABSTRACT

An assembly is described that consists of a gallium arsenide die chip and a fiber optic coupler bonded together about their respective mating surfaces. The chip includes laser light emitters. The fiber optic coupler has fiber optic light transmitters that require precise alignment with the laser light emitters of the chip about their mating surfaces. After alignment of the emitting/receiving and transmitting elements, the mating surfaces of the chip and coupler are bonded together.

18 Claims, 2 Drawing Sheets

SELF-ALIGNING METHOD AND INTERLOCKING ASSEMBLY FOR ATTACHING AN OPTOELECTRONIC DEVICE TO A COUPLER

FIELD OF THE INVENTION

The present invention relates to alignment and attachment procedures for optoelectronic devices and fiber optic couplers and, more particularly, to an improved self-aligning assembly technique for aligning and attaching a chip of laser emitters to a fiber optic coupler using lithographically and chemically etched alignment grooves on mating surfaces, and interlocking pins or balls.

BACKGROUND OF THE INVENTION

Owing to their small size, it is often difficult to precisely align and attach optoelectronic devices, such as a semiconductor chips, to fiber optic couplers. A gallium arsenide die chip, comprising a twelve channel Vertical Cavity Surface Emitting Laser (VCSEL) can be etched with a number of V-shaped grooves on the laser-dotted surface. A similar etching procedure can provide V-shaped grooves at mating locations on an end face of a coupler. Raised pins, or V-shaped ribs, can be inserted into the V-shaped grooves disposed on the coupler surface, which interlock with the etched features on the VCSEL surface. These interlocking pins provide perfect self-alignment between the two parts when they are brought into contiguous contact. The mating parts can then be permanently attached with epoxy or flexible adhesive.

DISCUSSION OF RELATED ART

It is known to provide V-shaped grooves to align an optical fiber core with a laser stripe, as illustrated in U.S. Pat. No. 4,466,696, issued to Carney on Aug. 21, 1984 for SELF-ALIGNED COUPLING OF OPTICAL FIBER TO SEMICONDUCTOR LASER OR LED. The V-groove is etched into the same substrate onto which the epitaxial layers for a narrow stripe laser have been grown. Although alignment is achieved between individual laser and optic fiber elements, the method does not teach how to achieve precise alignment for multi-channel mating elements, each disposed on a separate die and coupler mating surface that are to be permanently attached.

In U.S. Pat. No. 5,790,733, issued to Smith et al on Aug. 04, 1998 for OPTOELECTRONIC DEVICE RECEPTACLE AND METHOD OF MAKING SAME, a receptacle is shown attaching an optoelectronic device to a plurality of optic fibers. The patent teaches that each fiber rests in one of a plurality of parallel V-grooves that aligns the fibers to a VCSEL. A ball mates with a cavity on an adjacent surface to achieve alignment.

In U.S. Pat. No. 5,796,714, issued to Chino et al on Aug. 18, 1998 for OPTICAL MODULE HAVING A VERTICAL-CAVITY SURFACE-EMITTING LASER, the construction of a VCSEL module is described.

In U.S. Pat. No. 5,781,682, issued on Jul. 14, 1998 to Cohen et al for LOW-COST PACKAGE FOR PARALLEL OPTICAL COMPUTER LINK, an optical coupling apparatus is illustrated. Two vertically oriented pins are used to loosely align the separate parts.

In U.S. Pat. No. 5,854,867, issued to Lee et al on Dec. 29, 1998 for OPTICAL MODULE HAVING LENSES ALIGNED ON LENS-POSITIONING V-GROOVE AND FABRICATION METHOD THEREOF, lens positioning V-grooves are used to align lenses upon a substrate.

In U.S. Pat. No. 5,611,011, issued on Mar. 11, 1997 to Morlion et al for ALIGNMENT PIECE FOR A CONNECTOR FOR OPTICAL CONDUCTORS AND METHOD USING SAME, an alignment plate is shown having channels for a connector.

In U.S. Pat. No. 5,212,754, issued on May 18, 1993 to Basavanhally et al for OPTICAL LASER CONNECTOR, a connector apparatus is illustrated for coupling an optical fiber cable with laser devices. Two alignment pins are shown entering V-grooves.

In U.S. Pat. No. 5,163,108, issued on Nov. 10, 1992 to Armiento et al for METHOD AND DEVICE FOR PASSIVE ALIGNMENT OF DIODE LASERS AND OPTICAL FIBERS, a substrate is depicted containing V-grooves and bosses that align to exterior features on an optical device.

In U.S. Pat. No. 5,574,814, issued to Noddings et al on Nov. 12, 1996 for PARALLEL OPTICAL TRANSCEIVER LINK, an assembly of an optical interconnect module is illustrated. Alignment pins and slots are used in a fiber optic conductor assembly. Alignment slots are laser drilled in a chip carrier corresponding to the location of the alignment pins on the mating part.

In U.S. Pat. No. 5,266,352, issued to Filas et al on Nov. 30, 1993 for DEVICES FEATURING SILICONE ELASTOMERS, a single optical fiber is shown disposed in a V-groove is attached to a substrate by an elastomeric adhesive.

SUMMARY OF THE INVENTION

In accordance with the present invention, there is provided an assembly comprising a gallium arsenide die chip and a fiber optic coupler that have been bonded together about their respective mating surfaces. The chip comprises laser emitters. The fiber optic coupler comprises light transmitters that require precise alignment with the laser emitters of the chip, before bonding their mating surfaces together. A number of physical features, such as V-shaped grooves, are lithographed or etched upon the mating surfaces of the chip and the fiber optic coupler, respectively. The features on the chip are precisely referenced to the emitters, and are mated with corresponding, mating, physical features on the coupler that correspond to the transmitters to achieve precision alignment thereof. The die chip can comprise a Vertical Cavity Surface Emitting Laser (VCSEL) die. In one embodiment of the invention, cylindrical pins are disposed between respective V-shaped grooves to provide self-alignment of the assembly. Other configurations and geometries can also be used as long as the interlocking function is accomplished.

It is an object of this invention to provide an improved assembly and method for attaching light emitting elements to light transmitting elements respectively disposed upon mating component surfaces.

It is another object of the invention to provide an assembly comprising a VCSEL die or receiver die that is precisely aligned and bonded to a fiber optic coupler.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features an assembly comprising a gallium arsenide die chip and a fiber optic coupler bonded together about their respective mating surfaces. The chip comprises laser emitters/receivers, hereinafter called "emitters" or "emitting elements" for purposes of this description. The fiber optic coupler comprises light transmitters that require precise alignment with the laser emitters of the chip about their mating surfaces. After alignment of the emitting and transmitting elements, the mating surfaces of the chip and coupler are bonded together.

Figure 1:
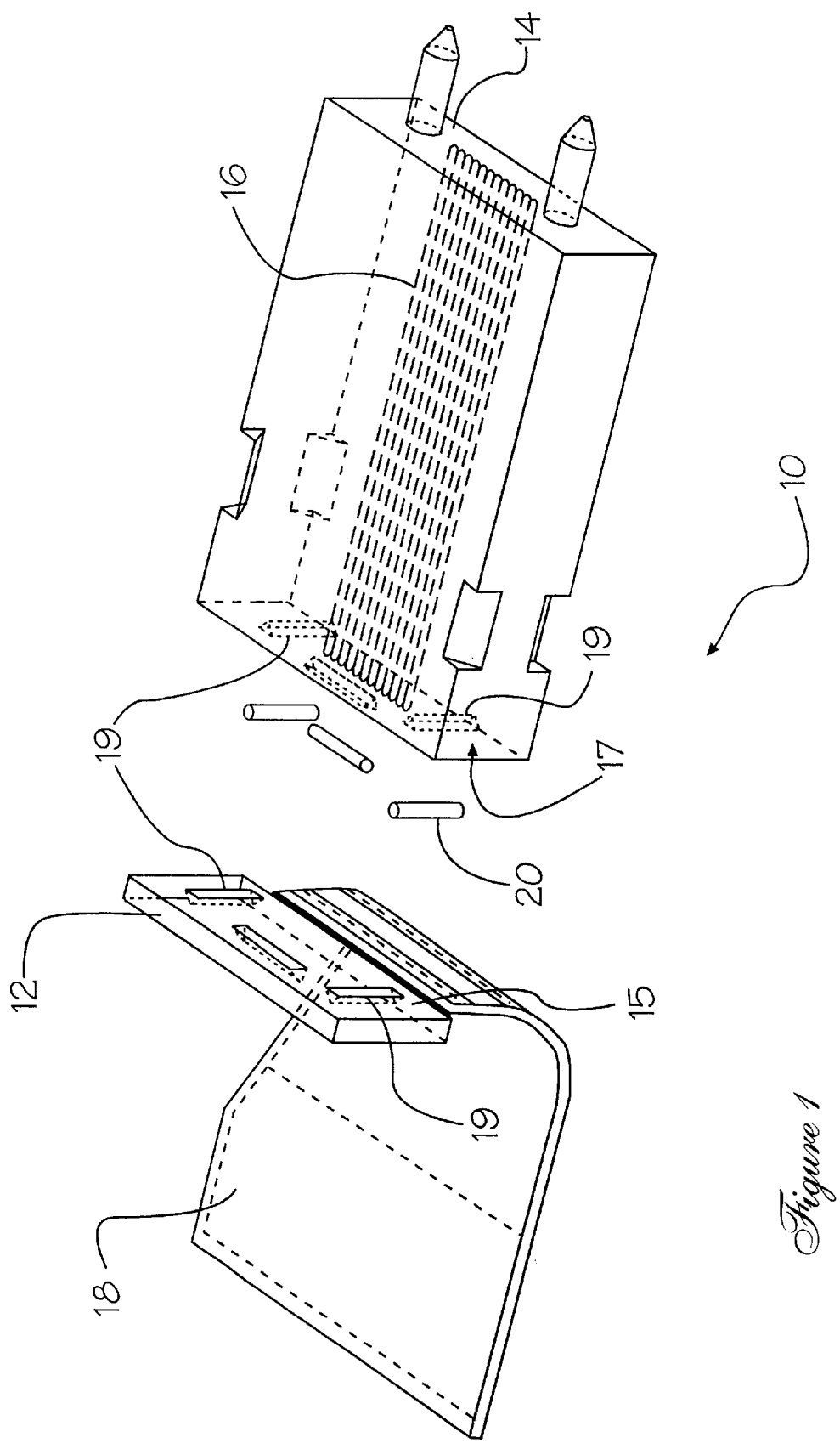
FIG. 1 illustrates a perspective, exploded view of the VCSEL chip and coupler assembly of this invention.

Now referring to FIG. 1, the chip 12 and coupler 14 of the assembly 10 of this invention are shown in exploded view. The chip 12 comprises a VCSEL having twelve laser emitters (not shown) that are disposed along a mid-portion of surface 15. The coupler 14 includes twelve transmitting optical fibers 16 that require precise alignment with the laser emitters. A flexible circuit 18 is attached to the VCSEL 12 in electronic communication therewith.

In order to achieve precise alignment between the emitting and transmitting elements of the chip 12 and the coupler 14, matching alignment features 19 are typically lithographed or etched into respective mating surfaces 15 and 17 of the chip 12 and coupler 14, as shown. The alignment features 19 can comprise a number of V-shaped grooves disposed on each respective surface 15 and 17. Shown in FIG. 1 are three alignment features 19, but it should be understood that more or less features can be used depending upon the size and shapes of the selected components and alignment features. The mating features 19 disposed on the chip 12 are referenced and correspond to the laser emitters. The mating features 19 on the coupler 14 are referenced and correspond to the transmitting optical fibers 16 opposite the mating features 19 of the chip 12.

Cylindrically-shaped alignment pins 20 are disposed between the mating V-shaped grooves to provide self-alignment for the assembly 10. Other devices and geometrical shapes can also be used to accomplish the mating function, such as balls and/or multi-surface protrusions with correspondingly-shaped cavities. After alignment, the chip 12 and the coupler 14 are bonded together with an epoxy or a flexible adhesive.

Figure 2:
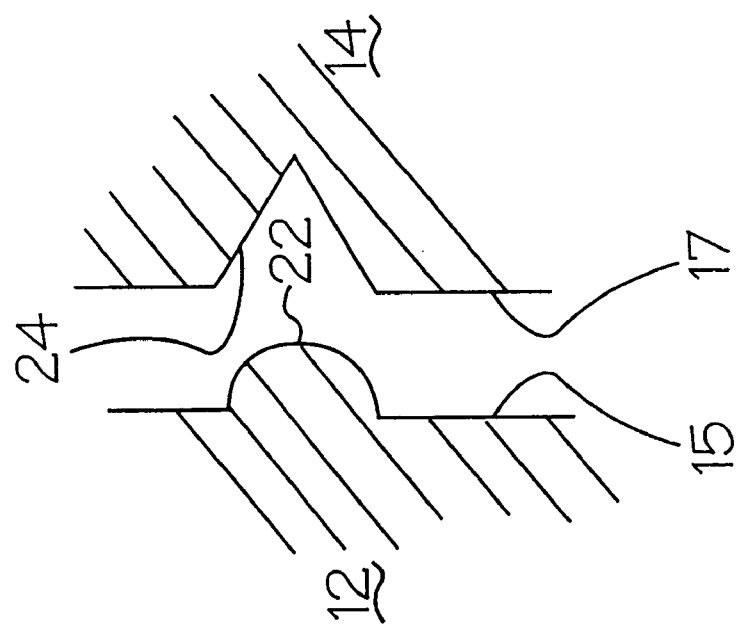
FIG. 2 depicts an enlarged, sectional view of an alternate embodiment of the alignment feature shown in FIG. 1.

Referring to FIG. 2, an alternate embodiment for the V-shaped grooves 19 depicted in FIG. 1 is illustrated in the enlarged sectional view. In this embodiment, each of the pins 20 and chip grooves has been replaced with a rounded protuberance 22 that mates with a corresponding V-shaped groove 24 of the coupler 14. The groove 24 and the protuberance 22 can be on reversed surfaces 12 and 14, respectively.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An assembly comprising: a chip and a fiber optic coupler that have been bonded together about respective mating surfaces, said chip comprising emitting elements and said fiber optic coupler comprising light transmitting elements, said light transmitting elements of said fiber optic coupler being precisely aligned with the emitting elements of said chip, a number of physical features being disposed upon said respective mating surfaces of said chip and said fiber optic coupler, respectively, each physical feature on said chip being etched or lithographed for precise referencing to said emitting elements and mated with a corresponding, mating, physical feature on the mating surface of said coupler, said physical features of said coupler each being referenced to said transmitting elements to achieve precision alignment of said chip and fiber optic coupler.

2. The assembly in accordance with claim 1, wherein said physical features on said chip comprise V-shaped grooves and said physical features on said fiber optic coupler comprise mating V-shaped grooves, and further comprising a number of cylindrically-shaped pins, each respectively disposed between mating V-shaped grooves between said chip and said fiber optic coupler.

3. The assembly in accordance with claim 1, wherein said physical features on said chip comprise rounded protuberances and said physical features on said fiber optic coupler comprise mating V-shaped grooves, each of which receives a corresponding, mating protuberance of said chip.

4. The assembly in accordance with claim 1, wherein said physical features on said chip comprise V-shaped grooves and said physical features on said fiber optic coupler comprise mating rounded protuberances, each of which is received in a corresponding, mating V-shaped groove in said chip.

5. The assembly in accordance with claim 1, wherein said chip comprises a Vertical Cavity Surface Emitting Laser (VCSEL) die.

6. The assembly in accordance with claim 1, wherein said chip comprises a gallium arsenide die.

7. The assembly in accordance with claim 1, further comprising epoxy disposed between said mating surfaces.

8. The assembly in accordance with claim 1, further comprising adhesive disposed between said mating surfaces.

9. An assembly comprising: a VCSEL/receiver chip and a fiber optic coupler bonded together about respective mating surfaces, said VCSEL/receiver chip comprising a plurality of light emitting laser elements and said fiber optic coupler comprising a plurality of light transmitting optical fiber elements being precisely aligned with said plurality of light emitting laser elements of said chip, a number of physical, etched or lithographed features being disposed upon said respective mating surfaces of said VCSEL/receiver chip and said fiber optic coupler, each physical feature on said chip being precisely referenced to one of said light emitting laser elements and mated with a corresponding, mating, physical feature on the mating surface of said coupler, said physical features of said coupler each being referenced to one of said light transmitting laser elements to achieve precision alignment of said VCSEL chip and said fiber optic coupler.

10. The assembly in accordance with claim 9, wherein said physical features on said VCSEL/receiver chip comprise V-shaped grooves and said physical features on said fiber optic coupler comprise mating V-shaped grooves, and further comprising a number of cylindrically-shaped pins each respectively disposed between mating V-shaped grooves between said VCSEL/receiver chip and said fiber optic coupler.

11. The assembly in accordance with claim 9, wherein said physical features on said VCSEL/receiver chip comprise rounded protuberances and said physical features on said fiber optic coupler comprise mating V-shaped grooves, each of which receives a corresponding, mating protuberance of said VCSEL/receiver chip.

12. The assembly in accordance with claim 9, wherein said physical features on said VCSEL/receiver chip comprise V-shaped grooves and said physical features on said fiber optic coupler comprise mating rounded protuberances, each of which is received in a corresponding, mating V-shaped groove in said VCSEL/receiver chip.

13. The assembly in accordance with claim 9, wherein said VCSEL chip comprises a gallium arsenide die.

14. The assembly in accordance with claim 9, further comprising epoxy disposed between said mating surfaces.

15. The assembly in accordance with claim 9, further comprising adhesive disposed between said mating surfaces.

16. A method for precisely aligning and assembling an optoelectronic device and an integrated circuit chip, the steps comprising:

providing a fiber optic coupler, said fiber optic coupler comprising a plurality of light transmitting elements and a first physical, etched or lithographed alignment feature;

providing an integrated circuit chip, said chip comprising a plurality of emitting elements;

aligning said plurality of emitting elements with said plurality of light transmitting elements; and bonding said fiber optic coupler to said integrated circuit chip.

17. The method for aligning and assembling in accordance with claim 16, wherein said integrated circuit chip further comprises a second physical alignment feature disposed thereon and corresponding to said first physical alignment feature for facilitating said aligning step and said bonding step by mating said respective first and second physical alignment features disposed on said coupler and said chip.

18. The method for aligning and assembling in accordance with claim 17, wherein said bonding step is accomplished by using adhesive.

* * * * *